United States Patent
Noldus

(10) Patent No.: US 9,794,776 B2
(45) Date of Patent: Oct. 17, 2017

(54) METHOD AND NETWORK ENTITY FOR S-CSCF SERVER ALLOCATION IN AN IMS BASED MULTIMEDIA OVER IP NETWORK

(75) Inventor: Rogier August Caspar Joseph Noldus, Goirle (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 14/115,484

(22) PCT Filed: May 4, 2011

(86) PCT No.: PCT/EP2011/057126
§ 371 (c)(1),
(2), (4) Date: Dec. 17, 2013

(87) PCT Pub. No.: WO2012/149966
PCT Pub. Date: Nov. 8, 2012

(65) Prior Publication Data
US 2014/0092853 A1    Apr. 3, 2014

(51) Int. Cl.
*H04W 28/04* (2009.01)
*H04W 8/20* (2009.01)
(Continued)

(52) U.S. Cl.
CPC ......... *H04W 8/205* (2013.01); *H04L 65/1016* (2013.01); *H04L 65/1046* (2013.01); *H04L 65/1073* (2013.01); *H04L 61/1588* (2013.01)

(58) Field of Classification Search
CPC ......... H04W 8/20; H04W 8/205; H04W 8/04; H04W 28/08; H04W 80/00; H04W 4/00;
(Continued)

(56) References Cited

U.S. PATENT DOCUMENTS

2008/0212569 A1* 9/2008 Terrill ............... H04L 29/12009
370/352
2008/0215736 A1* 9/2008 Astrom ............ H04L 29/06027
709/226
(Continued)

OTHER PUBLICATIONS

Unknown, Author. "Furthering the Discussion on the Dynamic Allocation of Users to Application Servers." Ericsson, Nortel. S2-062438. 3GPP TSG SA WG2 Architecture—SA2#53. Jun. 26-30, 2006. Lisbon, Portugal.
(Continued)

*Primary Examiner* — Andrew Chriss
*Assistant Examiner* — Rasha Fayed
(74) *Attorney, Agent, or Firm* — Murphy, Bilak & Homiller, PLLC

(57) ABSTRACT

Method and network entities for enabling server allocation in an IMS-based Multimedia over IP network. The method includes receiving by a S-CSCF server of the network subscriber registration data, transmitting, by the S-CSCF server, information representative of subscriber data to a P-CSCF server and/or to an HSS for storing the information representative of the subscriber data in a memory by the P-CSCF server and/or by the HSS, and transmitting, by the S-CSCF server, a S-CSCF group address to the P-CSCF server and/or to the HSS, respectively, said S-CSCF group address being representative of a group of S-CSCF servers, the S-CSCF server being included in said group of S-CSCF servers.

20 Claims, 4 Drawing Sheets

(51) Int. Cl.
*H04L 29/06* (2006.01)
*H04L 29/12* (2006.01)

(58) Field of Classification Search
CPC ............. H04L 65/1046; H04L 65/1016; H04L 65/1588; H04L 65/1073; H04L 65/1006; H04L 65/1063; H04L 65/4076; H04L 65/1069; H04L 65/1096; H04L 65/1095; H04L 65/105; H04L 29/08; H04L 29/06027; H04L 29/12009; H04L 29/12188; H04L 29/06; H04L 67/1036; H04L 67/1023; H04L 67/1008; H04L 67/1002; H04L 12/66
USPC ............... 370/329, 352, 355, 353, 356, 354; 709/226, 207, 204, 206, 217, 218, 205, 709/219, 223; 455/435.3, 435.2, 435.1, 455/433, 422.1
See application file for complete search history.

(56) References Cited

U.S. PATENT DOCUMENTS

| | | | |
|---|---|---|---|
| 2008/0254795 A1* | 10/2008 | Ratcliffe | H04L 65/105 455/435.1 |
| 2008/0316999 A1* | 12/2008 | Qiu | H04W 4/02 370/352 |
| 2009/0268723 A1* | 10/2009 | Przybysz | H04L 69/40 370/352 |
| 2010/0020790 A1* | 1/2010 | Pallares Lopez | H04L 29/06027 370/352 |
| 2010/0287406 A1* | 11/2010 | Ishii | H04L 45/22 714/4.1 |
| 2010/0306397 A1* | 12/2010 | Belinchon Vergara | H04L 29/12188 709/230 |

OTHER PUBLICATIONS

Unknown, Author. "3rd Generation Partnership Project; Technical Specification Group Core Network and Terminals; User Data Convergence (UDC); Technical realization and information flows; Stage 2 (Release 10)." 3GPP TS 23.335 V10.0.0. Mar. 2011.

Unknown, Author. "3rd Generation Partnership Project; Technical Specification Group Services and System Aspects; IP Multimedia Subsystem (IMS); Stage 2 (Release 11)." 3GPP TS 23.228 V11.0.0. Mar. 2011.

Unknown, Author. "3rd Generation Partnership Project; Technical Specification Group Services and System Aspects; IP Multimedia Subsystem (IMS); Stage 2 (Release 5)." 3GPP TS 23.228 V5.2.0. Oct. 2001.

3GPP. "The Mobile Broadband Standard." Homepage. Available online at www.3gpp.org.

3GPP. "3rd Generation Partnership Project; Technical Specification Group Services and System Aspects; IP Multimedia Subsystem (IMS); Stage 2 (Release 11)." 3GPP TS 23.228 V11.0.0. Mar. 2011. 1-272.

3GPP. "3rd Generation Partnership Project; Technical Specification Group Core Network and Terminals; IP multimedia call control protocol based on Session Initiation Protocol (SIP) and Session Description Protocol (SDP); Stage 3 (Release 10)." 3GPP TS 24.229 V10.3.0. Mar. 2011. 1-702.

Rosenberg et al. "Session Initiation Protocol." Internet Engineering Task Force Request for Comments 3261. The Internet Society. Jun. 2002. 1-244.

Rosenberg et al. "An Offer/Answer Model with the Session Description Protocol (SDP)." Internet Engineering Task Force Request for Comments 3264. The Internet Society. Jun. 2002. 1-23.

Schulzrinne et al. "RTP: A Transport Protocol for Real-Time Applications." Internet Engineering Task Force Request for Comments 3550. The Internet Society. Jul. 2003. 1-94.

Calhoun et al. "Diameter Base Protocol." Internet Engineering Task Force Request for Comments 3588. The Internet Society. Sep. 2003. 1-148.

IETF. "The Internet Engineering Task Force (IETF)." Homepage. Available online at www.ietf.org.

MobileIN. "Welcome to Mobile Intelligence." Homepage. Available online at www.mobilein.com.

Noldus et al. "Distributed Subscriber Data for Public Multimedia Networks." Siren 2009.

Singh, Kundan Narendra, "Reliable, Scalable and Interoperable Internet Telephony." Columbia University. 2006. Dissertation. 1-383.

Tirana et al. "Congestion Avoidance in S-CSCF Selection in an IMS Network." Proc. of 22nd International Teletraffic Congress (ITC22). Amsterdam. Sep. 2010. 1-8.

Xu et al. "De-Registration Based S-CSCF Load Balancing in IMS Core Network." IEEE 2009. 1-5.

* cited by examiner

METHOD AND NETWORK ENTITY FOR S-CSCF SERVER ALLOCATION IN AN IMS BASED MULTIMEDIA OVER IP NETWORK

TECHNICAL FIELD

The invention relates to a method and network node for use in an Internet Protocol Multimedia Subsystem, IMS, based Multimedia over Internet Protocol, IP, network.

BACKGROUND

In an Internet Protocol (IP) Multimedia Subsystem (IMS) network, such as an IMS based Multimedia over IP network, a subscriber may register with the network. Thereto, the User Equipment (UE), i.e. terminal, of the subscriber discovers which Proxy Call Session Control Function (P-CSCF) server it shall use for registration. Besides having the host name of the P-CSCF server internally configured, the UE may also request the P-CSCF server host name from the access network or obtain it through Dynamic Host Configuration Protocol (DHCP). The UE sends a Register message to the P-CSCF server. Hereto, the UE uses Domain Name System (DNS) query to resolve the P-CSCF server host name into IP address and Transport protocol (e.g. User Datagram Protocol (UDP)). The Register message contains subscriber registration data, hereinafter referred to as registration data. This registration data includes the subscriber's public identifier, the Home realm and the subscriber's contact address.

During registration, the P-CSCF server selects an inbound proxy, based on the Home realm, and then forwards the Register message to the selected inbound proxy, such as an Interrogating Call Session Control Function (I-CSCF) server. The I-CSCF server queries the Home Subscriber Server (HSS), based on the subscriber's public identifier, and asks for information regarding the Serving Call Session Control Function (S-CSCF) server that shall be allocated for this subscriber. If no S-CSCF server is allocated to the subscriber at this moment, then I-CSCF server allocates one, based on information as a.o. the S-CSCF capabilities, received from the HSS. "S-CSCF capabilities" is a subscription parameter that indicates the capabilities that the S-CSCF to be selected for this subscriber should support. The I-CSCF server then forwards the Register message to the selected S-CSCF server.

The selected S-CSCF server informs the HSS that this subscriber has registered and that this S-CSCF (the selected S-CSCF) has been assigned to that subscriber. The HSS stores the S-CSCF address for this subscriber, so subsequent registration or session establishment may be directed to this S-CSCF server. The HSS supplies the subscription profile to the S-CSCF server, which the S-CSCF server stores. The S-CSCF server also stores the contact address of the UE and the host name of the P-CSCF server. This enables the S-CSCF server to contact this terminal for session establishment, sending the message through the allocated P-CSCF server for the subscriber.

Successful result of the registration is reported towards the UE in a 200 Ok Session Initiation Protocol (SIP) message (refer to RFC 3261 for an overview of the response messages). The 200 Ok message contains a subset of subscription information, to be stored in the P-CSCF server. The 200 Ok message also contains the host name of the S-CSCF server. The 200 Ok message follows the reverse path of the Register message. The I-CSCF forwards the 200 Ok message to the P-CSCF server. The I-CSCF server does not store any subscriber data. The P-CSCF server stores the received subscription data and forwards the 200 Ok message, after partial removal of the subscription data, on to the UE. The UE stores the received subscription data as well as the host name of the S-CSCF server allocated to the subscriber associated with the UE. The UE is now in a state that it is able to initiate and answer multimedia communication sessions.

At re-registration, the UE will not force registration with the 'current' S-CSCF server. Instead, the I-CSCF server will, for every re-registration procedure, obtain a S-CSCF address from the HSS. The rationale is that the subscriber data may have been shifted from the S-CSCF server where it was originally stored to another S-CSCF server since a previous (re-)registration procedure. After every (re-)registration procedure, the UE, P-CSCF server, S-CSCF server and HSS are aligned again in terms of having shared relevant subscriber data, for establishing communication sessions to/from the UE. This synchronization of subscriber data in mentioned entities is critical for being able to establish communication sessions.

A particular problem occurs when subscriber data synchronization is lost, e.g. when the selected S-CSCF server is temporarily not operational (e.g. due to a restart) or when subscriber data is lost (e.g. due to a restoration procedure). When a S-CSCF server restarts and has lost subscriber data, a subsequent incoming call for a subscriber that was registered in that S-CSCF server may be handled by another S-CSCF server. That other S-CSCF server may obtain the subscriber data from the HSS. This allows for terminating unregistered call handling. A terminating service can be invoked for the subscriber, but the call can't be delivered to a terminal, since the S-CSCF server does not have a contact address, nor a P-CSCF address for that subscriber since these addresses are not always stored in the HSS. If that subscriber would at this point initiate a call, then the UE will try to establish the session through the S-CSCF server where the subscriber is no longer registered. The session establishment will fail. The UE, P-CSCF server, S-CSCF server and HSS will be re-synchronised after the next periodic registration of the subscriber.

SUMMARY OF THE INVENTION

It is an object of the invention to at least diminish the above mentioned problems.

Thereto, according to the invention is provided a method for enabling server allocation in an Internet protocol (IP) Multimedia Subsystem (IMS) based Multimedia over IP network. The method includes the following steps:

receiving by a Serving Call Session Control Function (S-CSCF) server of the network registration data, upon registration of said subscriber in said network, receiving by the S-CSCF server subscription data, from a Home Subscriber Server (HSS), upon registration of said subscriber in said network, the registration data and the subscription data together forming subscriber data, transmitting by the S-CSCF server, information representative of the subscriber data to a Proxy Call Session Control Function (P-CSCF) server and/or to a HSS for storing the information representative of the subscriber data in a memory by the P-CSCF server and/or by the HSS, transmitting, by the S-CSCF server, a S-CSCF group address to the P-CSCF server and/or the HSS, respectively, said S-CSCF group address being representative of a group of S-CSCF servers, the S-CSCF server being included in said group of S-CSCF servers.

Thus, the P-CSCF server and/or the HSS has knowledge of a S-CSCF group address representative of a group of S-CSCF servers. Hence, for the P-CSCF server and/or for the HSS, the registered subscriber has the group of S-CSCF servers allocated thereto, instead of a single specific S-CSCF server. The S-CSCF group address is determined during initial registration. The S-CSCF group address can be derived from S-CSCF capabilities. Thus, when a session is being initiated by the UE, or when a session destined for the subscriber is being initiated, a S-CSCF server of the group of S-CSCF servers is selected, e.g. ad hoc. Hence, the method goes beyond the principle of 'static S-CSCF server selection', to further minimize the chance that an overload condition in a S-CSCF server, or other form of non-operational condition, would hamper communication session establishment.

According to an aspect, the information representative of the subscriber data transmitted by the S-CSCF server to the P-CSCF server and/or to the HSS includes the actual subscriber data. According to another aspect, the information representative of the subscriber data transmitted by the S-CSCF server to the P-CSCF server and/or to the HSS includes a storage address (such as a (secure) File Transfer Protocol (FTP) address or (secure) Hypertext Transfer Protocol (HTTP) address) where the actual subscriber data is stored and can be retrieved from by the P-CSCF server and/or by the HSS. The storage address may refer to a storage location on the P-CSCF server, on the HSS or on an auxiliary database server. The remainder of the document refers to 'storage server'.

According to one aspect, the method includes the steps of receiving by the P-CSCF server a multimedia service request, being a session initiation message for initiating a communication session or a non-session related multimedia service transaction, e.g. from a UE associated with the subscriber; selecting, by the P-CSCF server, a S-CSCF server on the basis of the S-CSCF group address, and including, by the P-CSCF server, information representative of the subscriber data in the multimedia service request, and transmitting said multimedia service request to the selected S-CSCF server.

According to another aspect, the method includes the steps of receiving by an Interrogating Call Session Control Function (I-CSCF) server a multimedia service request being a session initiation message destined for the subscriber; interrogating the HSS associated with the subscriber, by the I-CSCF server, for obtaining the S-CSCF group address and for obtaining information representative of the subscriber data; selecting, by the I-CSCF server, a S-CSCF server on the basis of the S-CSCF group address; and including, by the I-CSCF server, information representative of the subscriber data in the session initiation message, and transmitting said session initiation message to the selected S-CSCF server. Herein the information representative of the subscriber data transmitted by the HSS to the I-CSCF server preferably includes the actual subscriber data. Alternatively, the information representative of the subscriber data includes a storage address.

According to another aspect, the method includes the steps of receiving by an I-CSCF server a multimedia service request, being a session initiation message, e.g. from a Session Initiation Protocol (SIP) Application Server (AS) acting for the subscriber, for originating a communication session on behalf of the subscriber or a non-session related multimedia service transaction; interrogating the HSS associated with the subscriber, by the I-CSCF server, for obtaining the S-CSCF group address and information representative of the subscriber data; selecting, by the I-CSCF server, a S-CSCF server on the basis of the S-CSCF group address; including, by the I-CSCF server, information representative of the subscriber data in the multimedia service request, and transmitting said multimedia service request to the selected S-CSCF server. Herein the information representative of the subscriber data transmitted by the HSS to the I-CSCF server preferably includes the actual subscriber data. Alternatively, the information representative of the subscriber data includes a storage address.

Thus, the P-CSCF server (for an originating session request) or the I-CSCF server (for an originating or a terminating session request) selects the S-CSCF server to be used on the basis of the S-CSCF group address upon receiving a multimedia service request. Also, the P-CSCF server or the I-CSCF server can take the operational condition (including load status) of the available S-CSCF servers associated with the S-CSCF group address into consideration when selecting a S-CSCF server for handling the multimedia service request.

According to another aspect, the P-CSCF server or the I-CSCF server selects the S-CSCF server on the basis of one or more of:
  an internal table of S-CSCF servers associated with the S-CSCF group address,
  DNS based name resolving of the S-CSCF group address, and
  the operational condition, including load status, of the S-CSCF servers included in the group of S-CSCF servers.

According to another aspect the S-CSCF server refrains from persistently storing, for the duration of the registration period, information representative of the subscriber data. The S-CSCF server may cache the information representative of the subscriber data, but this information is not persistently, i.e. permanently, stored for the duration of the registration period. It be emphasised that subscriber data that is cached in a S-CSCF server has the status of cache and does not represent the formal subscriber data, to be used for originating call handling. Instead, the S-CSCF server transmits the information representative of the subscriber data to the P-CSCF server and/or to the HSS for storing the information representative of the subscriber data in a memory by the P-CSCF server and/or by the HSS.

According to another aspect, the information representative of the subscriber data stored in the memory by the P-CSCF server and/or by the HSS, or stored at the storage address(es) is deleted upon deregistration by the subscriber. For that purpose a message including a 'delete instruction' is transmitted by the S-CSCF server to the P-CSCF server and/or to the HSS, or to the server associated with the storage address, respectively.

According to another aspect the information representative of the subscriber data includes a time-stamp indicating when the subscriber data was last updated. Then, the S-CSCF server determines, upon receiving the multimedia service request, whether it has cached subscriber data associated with the subscriber, and
  if the S-CSCF server does not have the subscriber data cached, retrieving the subscriber data from the storage address,
  if the S-CSCF server has the subscriber data cached, comparing a time-stamp of the cached subscriber data with the time-stamp received in the information representative of the subscriber data, and only if the time-stamp received in the information representative of the subscriber data is later than the time-stamp of the cached subscriber data, retrieving the subscriber data from the storage address.

According to the invention is also provided a network node, such as a S-CSCF server, for use in an IMS-based Multimedia over IP network, including:
- a receiving unit arranged for receiving registration data of said subscriber and receiving subscription data of said subscriber, upon registration of said subscriber with said network, the registration data and the subscription data together forming subscriber data
- a transmitting unit arranged for transmitting a node group address, such as a S-CSCF group address, and information representative of the subscriber data to a P-CSCF server and/or to an HSS for storing the information representative of the subscriber data in a memory by the P-CSCF server and/or by the HSS respectively, said node group address being representative of a group of such network nodes.

According to an aspect of the network node, such as a S-CSCF server, the information representative of the subscriber data transmitted by the network node to the P-CSCF server and/or to the HSS includes the actual subscriber data. According to another aspect, the information representative of the subscriber data transmitted by the network node to the P-CSCF server and/or to the HSS includes a storage address (such as a (secure) File Transfer Protocol (FTP) address or (secure) Hypertext Transfer Protocol (HTTP) address) where the actual subscriber data is stored and can be retrieved from by the P-CSCF server and/or by the HSS.

According to the invention is also provided a network node, such as a P-CSCF server, for use in an IMS-based Multimedia over IP network including:
- a receiving unit arranged for receiving a multimedia service request, being a session initiation message, e.g. from a UE associated with the subscriber, for initiating a communication session or a non-session related multimedia service transaction, said multimedia service request optionally including a S-CSCF group address,
- a selection unit arranged for selecting a S-CSCF server from a group of S-CSCF servers on the basis of the S-CSCF group address, whereby the S-CSCF group address may be received from the UE or may be retrieved from internal data store,
- an inclusion unit arranged for including, by the P-CSCF server, information representative of the subscriber data in the multimedia service request, and
- a transmitting unit arranged for transmitting said multimedia service request to the selected S-CSCF server.

According to an aspect, the selection unit is arranged for selecting the S-CSCF server on the basis of at least one of
- an internal table of S-CSCF servers associated with the S-CSCF group address,
- DNS based name resolving of the S-CSCF group address,
- the operational condition, including load status, of the S-CSCF servers included in the group of S-CSCF servers.

According to the invention is also provided a network node, such as an I-CSCF server, for use in an IMS-based Multimedia over IP network, including:
- a receiving unit arranged for receiving a multimedia service request being a session initiation message, such as a terminating session initiation message destined for a subscriber or an originating session initiation message from a SIP-Application Server (SIP-AS) acting on behalf of a subscriber,
- an interrogating unit arranged for interrogating an HSS for obtaining a S-CSCF group address, and for obtaining information representative of subscriber data of the subscriber,
- a selection unit arranged for selecting a S-CSCF server from a group of S-CSCF servers on the basis of the S-CSCF group address,
- an inclusion unit arranged for including the obtained information representative of the subscriber data in the session initiation message, and
- a transmitting unit arranged for transmitting said session initiation message to the selected S-CSCF server.

According to an aspect, the selection unit is arranged for selecting the S-CSCF server on the basis of at least one of
- an internal table of S-CSCF servers associated with the S-CSCF group address,
- DNS based name resolving of the S-CSCF group address,
- the operational condition, including load status, of the S-CSCF servers included in the group of S-CSCF servers.

BRIEF DESCRIPTION OF THE DRAWINGS

The invention will now be further elucidated by means of non-limiting examples referring to the drawings, in which.

DETAILED DESCRIPTION

The invention proposes a method that dispenses with the need for a stateful registrar. The method entails that a Serving Call Session Control Function (S-CSCF) server, i.e. the registrar, will not have to keep subscriber data in persistent data store. Multimedia communication sessions may be established through any S-CSCF server of a group of S-CSCF servers.

Figure 1:
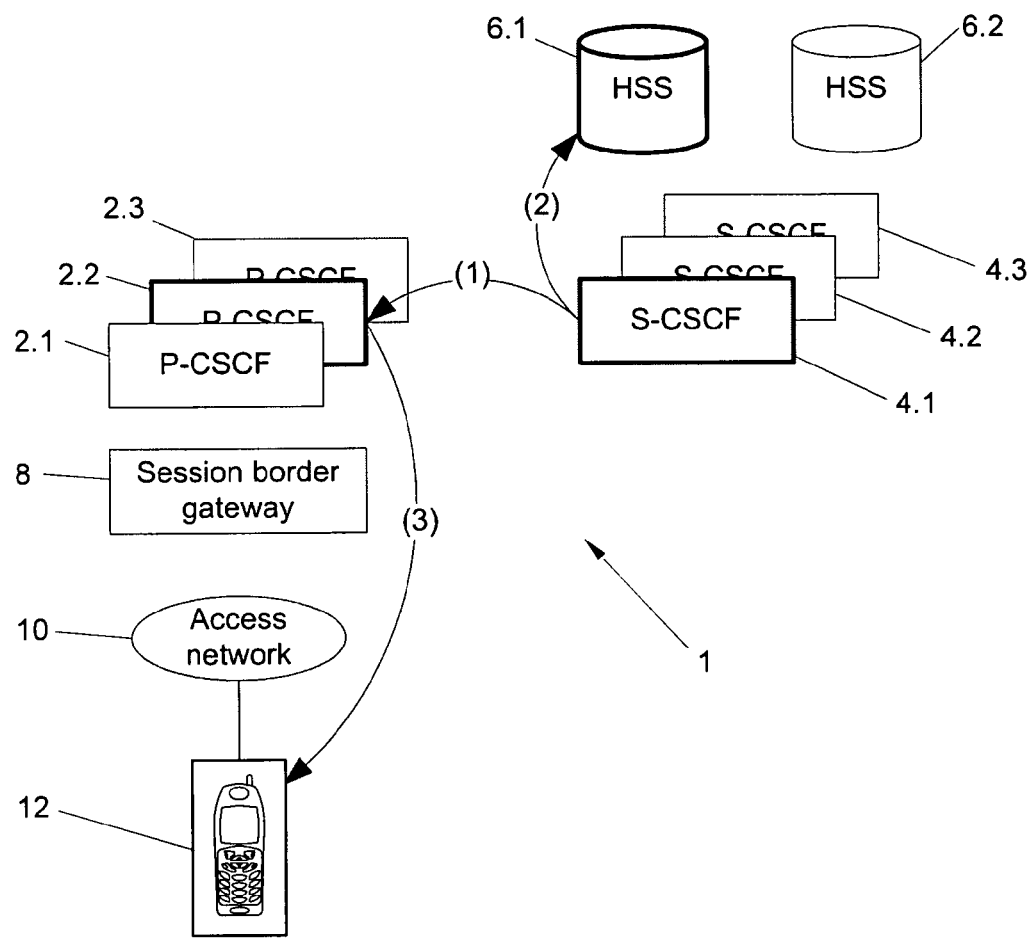
FIG. 1 is an embodiment of registration procedure according to the invention.

FIG. 1 depicts an example of a registration process. FIG. 1 shows an Internet Protocol (IP) Multimedia Subsystem (IMS) network 1. The IMS network 1 includes a plurality of Proxy Call Session Control Function (P-CSCF) servers 2.$i$ (i=1, 2, 3, . . . ) and a plurality of Serving Call Session Control Function (S-CSCF) servers 4.$j$ (j=1, 2, 3, . . . ). Further, the IMS network 1 includes a plurality of Home Subscriber Servers (HSS's) 6.$k$ (k=1, 2, . . . ). In the example of FIG. 1 further a Session Border Gateway (SBG) 8 and Access Network (AN) 10 are shown. FIG. 1 also shows a User Equipment (UE) 12 associated with a subscriber of the IMS network 1.

When the subscriber registers with the IMS network 1, the User Equipment 12, i.e. terminal, of the subscriber discovers the P-CSCF server 2.2 it shall use for registration. The host name of the P-CSCF server 2.2 may be internally configured in the User Equipment 12. Alternatively, the UE 12 may request the P-CSCF server 2.2 host name from the access network 10 or obtain it through Dynamic Host Configuration Protocol (DHCP). The UE 12 sends a Register message to the P-CSCF server 2.2. Hereto, the UE 12 uses a Domain Name System (DNS) query to resolve the P-CSCF server host name into IP address and Transport protocol (e.g. User Datagram Protocol (UDP)). The Register message contains registration data. Further, a registrar, here S-CSCF server 4.1, is selected by an Interrogating Call Session Control Function (I-CSCF) server 14 (not shown in FIG. 1). The S-CSCF server 4.1 receives the registration data from UE 12 and the P-CSCF server 2.2. The S-CSCF server 4.1 further receives subscription data relating to the subscriber from the HSS 6.1. The registration data and the subscription data together form subscriber data. Here, this subscriber data includes the subscriber's public identifier, the Home realm and the subscriber's contact address.

When the registration process is complete (optionally including third party registration(s) to Application Server(s)), the S-CSCF server 4.1 distributes information representative of the subscriber data instead of maintaining it in a database of the S-CSCF server 4.1 itself. This distribution is as follows in FIG. 1:

(1) Subscriber data that is needed in the S-CSCF server 4.1 for originating session establishment from the UE 12 is pushed to the P-CSCF server 2.2, along with the other subscriber data that is normally sent back to P-CSCF server 2.2 during registration. Some of the subscriber data that is pushed to the P-CSCF server was received from the HSS by the S-CSCF server.

(2) Subscriber data that is needed in the S-CSCF server 4.1 for originating or terminating session establishment from c.q. towards the subscriber is pushed to the HSS 6.1. This subscriber data includes, among others, the registered contact address(es). According to the prior art, service subscriber data would be transferred from the HSS 6.1 to the S-CSCF server 4.1 during registration. In this example, however, such subscriber data remains in the HSS 6.1 during registration.

(3) The Service-route, i.e. the S-CSCF server address, that is sent from the S-CSCF server 4.1 to the P-CSCF server 2.2 and from the P-CSCF server to the UE 12 does not contain the address of this particular S-CSCF server 4.1, but contains a S-CSCF group address instead.

The above described 'pushing' of subscriber data is done through the existing Session Initiation Protocol (SIP) signaling used during registration. In this example, existing SIP messages are extended to be able to contain the required subscriber data, in addition to the data conveyed in these messages according to the prior art.

The transfer of subscriber data from the S-CSCF server 4.1 to the P-CSCF server 2.2 does not require additional signaling. The subscriber data is transported in the 200 Ok response message that is sent from the S-CSCF server 4.1 to the P-CSCF server 2.2, resulting from successful registration. The P-CSCF server 2.2 determines, by virtue of receiving the subscriber data from the S-CSCF server 4.1, that it has to store this subscriber data and include it in an initial SIP request message from the subscriber.

The transfer of subscriber data from the S-CSCF server 4.1 to the HSS 6.1 does not require additional signaling. The data is transported in the Diameter Server assignment request (SAR) message, which forms part of registration procedure and which according to the prior art is used to store the S-CSCF server address in the HSS 6.1, for this subscriber. The HSS 6.1 determines, by virtue of receiving the subscriber data from the S-CSCF server 4.1, that it has to store this subscriber data and include it in a response to a Diameter Location information request (LIR) message from the I-CSCF server.

Figure 2:
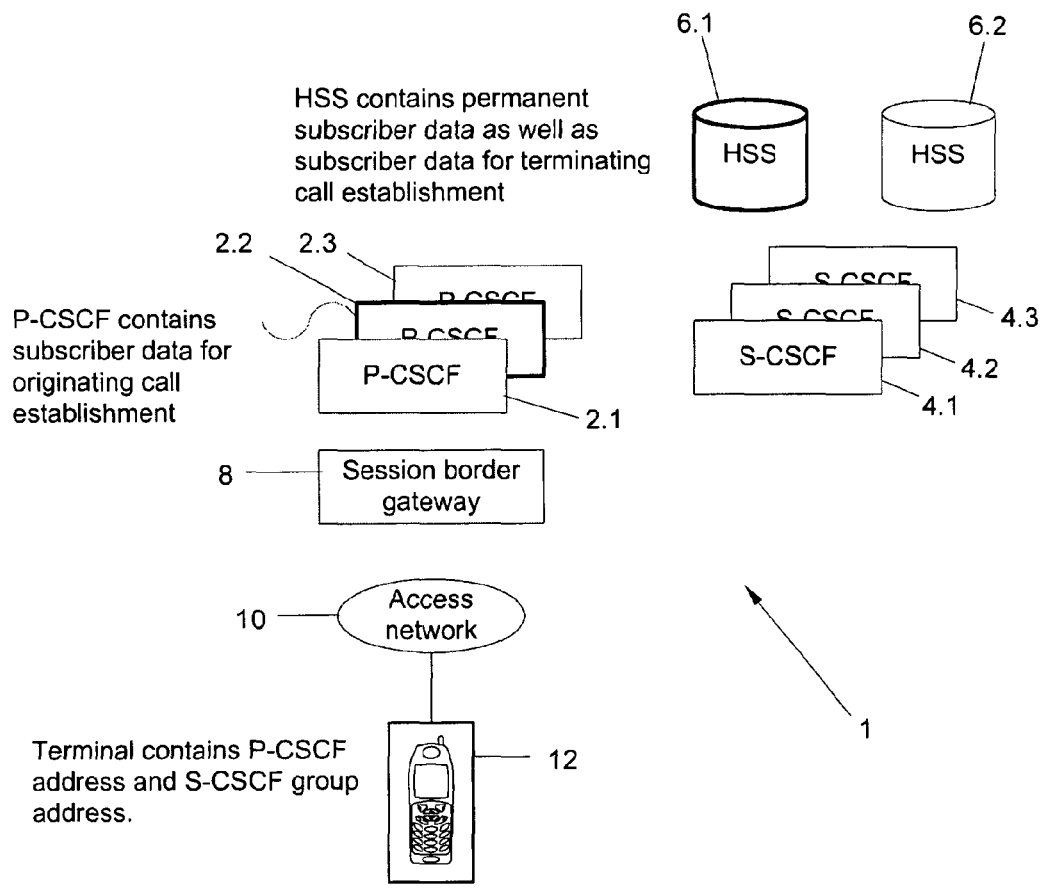
FIG. 2 is an embodiment of subscriber data distribution according to the invention.

FIG. 2 depicts distribution of subscriber data after registration is complete. As depicted in FIG. 2, the S-CSCF server 4.1 does not keep the subscriber data. The number of nodes (databases) over which the subscriber data needs to be synchronized is hereby reduced. This reduces also the vulnerability on service availability resulting from planned or unplanned (temporary) node outage. An operator may install the S-CSCF server capability as required, depending on the traffic generated in the network.

Below follows an overview of various call cases for which subscriber data is needed in a S-CSCF server.

Originating Call Establishment

Figure 3:
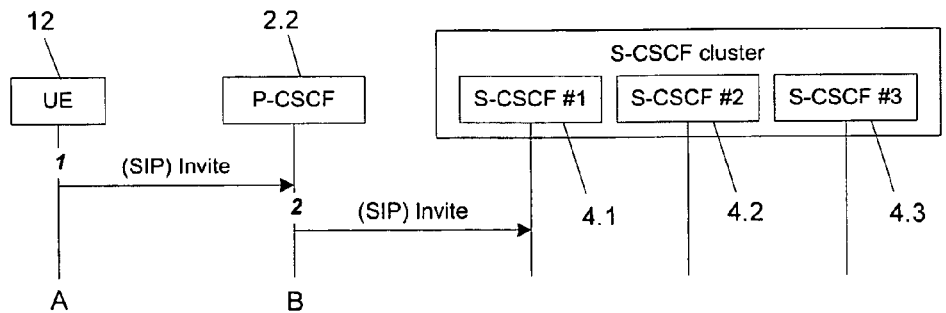
FIG. 3 is an embodiment of originating call establishment according to the invention.

When a communication session is initiated by the UE 12, it establishes the session through the P-CSCF server 2.2 in which it is registered. The UE 12 uses the S-CSCF group address, if previously received from the P-CSCF server 2.2. The P-CSCF server 2.2 will hence use said group address to select a S-CSCF server for this session from the S-CSCF servers associated with the S-CSCF group address. The P-CSCF server 2.2 may use hereto DNS based load sharing. In the session establishment towards the selected S-CSCF server, the P-CSCF server includes the stored subscriber data. The S-CSCF server will hence have the subscriber data available and can handle the call establishment. For the remainder of the communication session, control plane signaling traverses the S-CSCF server that is selected for this session. Referring to FIG. 3, at A the UE 12 establishes the call to the P-CSCF server 2.2 of which the address is stored in the UE 12. The UE 12 includes the stored S-CSCF group address, if received during registration, in the session establishment message. At B the P-CSCF server 2.2 includes the information representative of the subscriber data in the session establishment message, selects (e.g. through DNS load sharing) a S-CSCF server from the group of S-CSCF servers and forwards the message to that S-CSCF server.

Different communication sessions initiated by the UE 12 don't have to be served by the same S-CSCF. Session control process instances for different calls initiated by the same UE 12 are not related to one another. Hence a different S-CSCF server can be selected from the group of S-CSCF servers for different calls initiated by the same UE 12.

The selection of the S-CSCF server 4.1 by the P-CSCF server 2.2 follows indirectly the method of S-CSCF server selection by the I-CSCF server. When the subscriber performs registration, the SIP Register request message is sent through the I-CSCF server 14. The I-CSCF server 14 receives 'S-CSCF capabilities' from the HSS 6.k. This 'S-CSCF capabilities' is used to map into a table with S-CSCF servers. Hence, the table may refer to a group of S-CSCF servers 4.j. The 'S-CSCF capabilities' can be used as a basis for the selection of one or more S-CSCF servers 4.j that may be suitable for being assigned to this subscriber. The I-CSCF server selects one S-CSCF server.

In similar manner, the Service-Route that the S-CSCF server returns towards the P-CSCF server 2.2, and that is optionally forwarded to the UE 12, can be a S-CSCF group address. The S-CSCF group address represents a group of S-CSCF servers 4.j. The P-CSCF server 2.2 may have an internal table of S-CSCF servers 4.j to select one S-CSCF server. Alternatively, DNS based name resolving may be used by the P-CSCF server to select a S-CSCF server.

The P-CSCF server 2.2 stores the 'S-CSCF group address' parameter. Optionally, the P-CSCF server 2.2 sends the S-CSCF group address to the UE 12 during registration procedure; the UE 12 then subsequently includes the S-CSCF group address in a multimedia service request. When the P-CSCF server 2.2 establishes a call, it uses this 'S-CSCF group address' parameter to select a S-CSCF server from the group of S-CSCF servers 4.*j*.

Terminating Call Establishment

Figure 4:
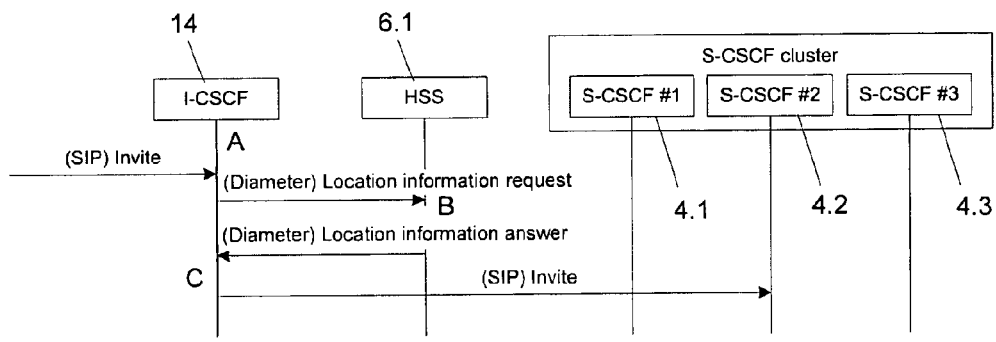
FIG. 4 is an embodiment of terminating call establishment according to the invention.

When a call is established towards a subscriber, session establishment signaling traverses the I-CSCF server 14. The I-CSCF server 14 interrogates the HSS 12 in order to obtain a S-CSCF group address. The I-CSCF server 14 can hence select a S-CSCF server from the associated group of S-CSCF servers 4.*j* that will handle this call. The HSS 12 will, in addition, provide the subscriber data that is needed for the handling of this call by the selected S-CSCF server 4.2. Such subscriber data will include, among others, application server trigger data (initial filter criteria), registered contact address(es) and P-CSCF address(es) (path; per registered contact address). Referring to FIG. 4, at A the I-CSCF server 14 queries the HSS 6.1 as normal, for a terminating call for the subscriber. At B the HSS 6.1 returns the S-CSCF group address and subscriber data, including contact address(es) etc. At C the I-CSCF server 14 includes the subscriber data in the Invite message, selects a S-CSCF server 4.2 of the group of S-CSCF servers 4.*j* associated with the S-CSCF group address and forwards the Invite message to that S-CSCF server 4.2. The S-CSCF server 4.2 can now handle the terminating call as normal, including the invocation of terminating service(s), if needed. Since the HSS 6.1 has provided the contact address of every registered terminal to the I-CSCF server 14, which has forwarded this information to the S-CSCF server 4.2, the S-CSCF server 4.2 can apply actions like SIP forking.

The HSS 6.1 may, instead of sending the S-CSCF group address to the I-CSCF server 14, as described above, return 'S-CSCF capabilities' to the I-CSCF server 14. The I-CSCF server 14 then uses the 'S-CSCF capabilities' to derive a group of S-CSCF servers and to select a S-CSCF from that group of S-CSCF servers 4.*j*.

Service-Initiated Call Establishment

Figure 5:
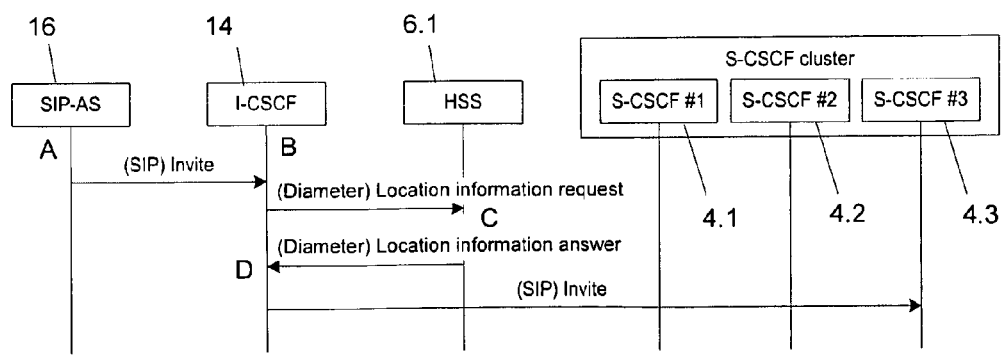
FIG. 5 is an embodiment of service-initiated call establishment according to the invention.

When an application server (AS) initiates a communication session on behalf of a user, it may be required that this communication session is handled in a S-CSCF server for applying originating services for that session. Such originating call establishment by application server (AS) includes HSS interrogation from the I-CSCF server 14. The SIP Invite passing through the I-CSCF server 14 indicates with an orig parameter in the Route header that the I-CSCF server 14 shall contact the HSS 6.*k* for the calling subscriber, as opposed to contacting the HSS for the called subscriber. The HSS 6.*k* provides information to the I-CSCF server 14 to select a S-CSCF server 4.*j* for this session. The HSS 6.*k* also provides information needed by the selected S-CSCF server to apply the required originating services. Referring to FIG. 5, at A the SIP-Application Server (SIP-AS) 16 initiates call establishment, by sending establishment message to the I-CSCF server 14, including an 'orig' parameter. At B the I-CSCF server 14 queries the HSS 6.1 for obtaining a S-CSCF server address. The HSS 6.1 at C returns the S-CSCF group address as well as subscriber data related to the subscriber on whose behalf the call is established. At D the I-CSCF server 14 includes the subscriber data in the Invite message, selects a S-CSCF server 4.3 and forwards the Invite message to that S-CSCF server 4.3. The subscriber on whose behalf the call is established may also be the service itself, as opposed to a single subscriber.

IMS facilitates advanced services like call pick-up (answer an incoming call on another terminal), device transfer (transfer an active call to another terminal) and access transfer (transfer the call from one access network 10, such as WLAN, to another access network, such as UMTS). Such advanced services are realized by creating a combination of originating call leg and terminating call leg. The selection of the S-CSCF server 6.*j* described herein has the effect that for each call, a different S-CSCF server 6.*j* may be selected. When device transfer is applied, for example, the subscriber establishes a call pick-up call from another one of his/her registered devices, with the intention to continue the call on that other terminal. The call from this other terminal may be served by another S-CSCF server than the call that was ongoing form the first terminal.

As an optional addition to the above, the S-CSCF server may cache the subscriber data it has received from the P-CSCF server or from the HSS. Caching of subscriber data in the S-CSCF server does not imply that a subscriber is registered with that S-CSCF server. Caching serves as a means to optimize the subscriber data transfer to the S-CSCF server selected as described above. Whilst caching optimizes subscriber data transfer to the selected S-CSCF server, it maintains the principle of the above described selection of the S-CSCF server, i.e. improved load sharing over multiple S-CSCF servers and increased robustness, catering for the case that one S-CSCF server is (temporarily) not operational.

For example, when the P-CSCF server has selected a S-CSCF server for originating call establishment and forwards a SIP Invite to that S-CSCF server, it behaves as follows:

include in the SIP Invite request message a reference to subscriber data;

attach a time-stamp to the reference to subscriber data.

The reference to subscriber data shall be a reference that the S-CSCF server may use to obtain the required subscriber data. It may e.g. be a (Secure) File Transfer Protocol ((S)FTP) address or a (Secure) Hypertext Transfer Protocol ((S)HTTP) address, allowing the S-CSCF server to obtain the subscriber data, if needed. As described above, the P-CSCF server keeps the subscriber data required for originating call establishment. So, this (S)FTP address or a (S)HTTP address may be an address at the P-CSCF server.

The time-stamp associated with the subscriber data indicates the time the subscriber data was last updated.

Now the S-CSCF server will behave as follows:

When the S-CSCF server receives a SIP Invite from the P-CSCF server, the S-CSCF server determines whether it has cached subscriber data for this subscriber.

If the S-CSCF server does not have subscriber data for this subscriber in cache, it uses the received (S)FTP or (S)HTTP reference to obtain the subscriber data. When the S-CSCF server has received the subscriber data, it caches it. The S-CSCF server then continues call handling, using the cached subscriber data.

If the S-CSCF server has subscriber data for this subscriber in cache, it compares the time-stamp of the cached subscriber data with the time-stamp received with the reference. If the S-CSCF server determines that the time-stamps are equal, then the cached subscriber data is still valid. The S-CSCF server then continues call handling, using the cached subscriber data. If the S-CSCF server determines that the time-stamps differ, then the cached subscriber data has expired. The S-CSCF server then uses the received (S)FTP or (S)HTTP reference to obtain and cache the subscriber data. The S-CSCF server then continues call handling, using the cached subscriber data.

It may occur that subscriber data is cached in two separate S-CSCF servers. It be emphasised that subscriber data that is cached in a S-CSCF server has the status of cache and does not represent the formal subscriber data, to be used for originating call handling. At call establishment, the S-CSCF server will ensure that it has the current subscriber data available, as described above.

The S-CSCF server may at some point in time purge subscriber data from cache, e.g. when the subscriber data has not been used for a certain amount of time, or when the available cache storage is reaching a predetermined maximum level. This is normal cache behaviour. When subscriber data is purged and call establishment occurs, the S-CSCF server acts as described above, i.e. it will obtain the subscriber data from the storage address, which may relate to the P-CSCF server.

In another example, when the HSS sends a Diameter Location information answer (LIA) to the I-CSCF server, it includes the subscriber data reference and time-stamp, as described for the Invite from the P-CSCF server to the S-CSCF server. If the S-CSCF server has non-expired subscriber data in cache, the S-CSCF server will use that subscriber data for the terminating call handling. Otherwise, it will obtain the subscriber data from the HSS, using the received reference. Purging of subscriber data (terminating subscriber data) by the S-CSCF server and subsequent retrieval of the required subscriber data profile by the S-CSCF server, applies as for originating call establishment.

In another example, the process of service-initiated call includes the use of Diameter LIR & LIA between the I-CSCF server and the HSS. The HSS includes a reference to the subscriber data instead of including the actual subscriber data. The behaviour is further in line with the method for originating call handling.

As an optional addition to the above, when the I-CSCF server is engaged in handling a terminating call, it receives a S-CSCF group address from the HSS. The I-CSCF server may now select one S-CSCF server that will handle this terminating call for the called subscriber. In doing so, the I-CSCF server may take cognizance of the S-CSCF server that is currently serving the calling subscriber. Hereto, the I-CSCF server analyses the Via: header or the Record-route header in the SIP Invite request. The I-CSCF server may hence select the same S-CSCF server for handling the terminating call for the called party as the S-CSCF server that is handling the originating call from the calling party. This leads to further signaling optimization, compared to the case that different S-CSCF servers happen to be selected. If the I-CSCF server selects a different S-CSCF server for called party than is currently used for calling party, then the messaging related to the further SIP transactions within the SIP session has to be transferred between two S-CSCF servers, as opposed to being transferred internally within one S-CSCF server.

It be emphasized that this shall not be the only criterion for the I-CSCF server to select a S-CSCF server for handling the terminating call for the called party. The I-CSCF server may also consider criteria as (i) load sharing across a group of S-CSCF servers, (ii) required S-CSCF server capability for called party and (iii) momentary load of the respective S-CSCF servers.

Figure 6:
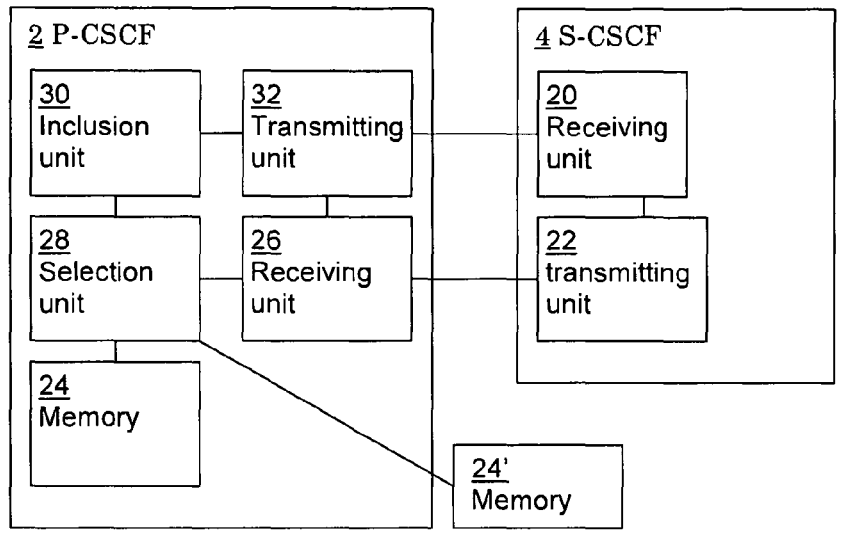
FIG. 6 is an embodiment of a communications network system according to the invention.
Figure 7:
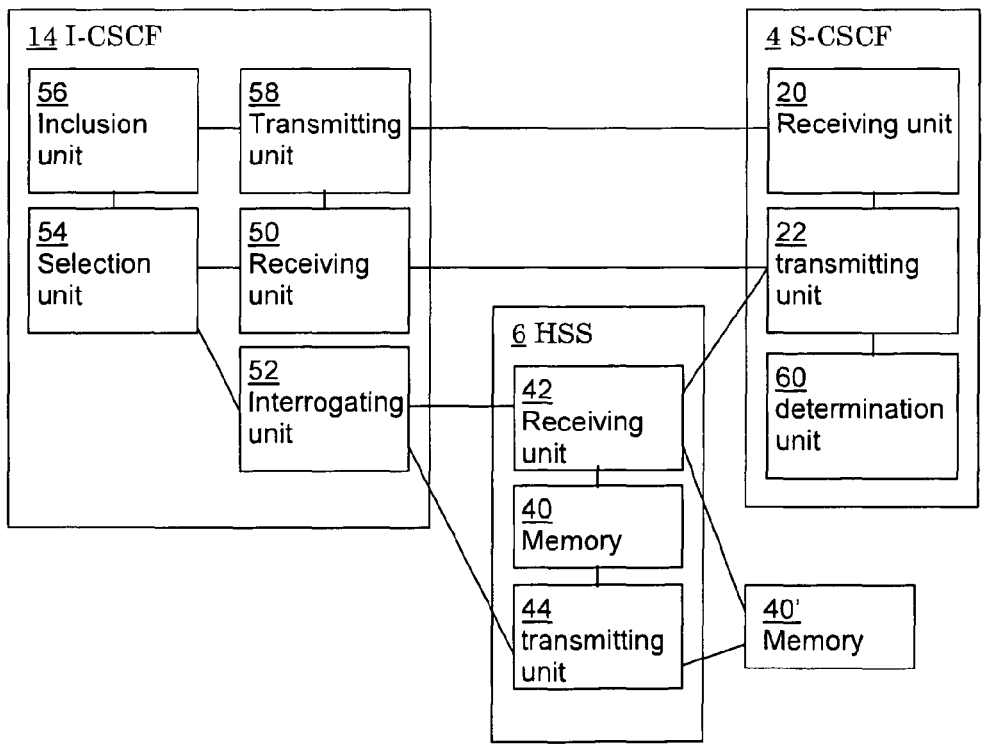
FIG. 7 is an embodiment of a communications network system according to the invention.

FIG. 6 and FIG. 7 show examples of a system according to the invention. FIG. 6 and FIG. 7 show a first network node, in this example a S-CSCF server 4, for use in an IMS-based Multimedia over IP network. The S-CSCF server 4 includes a receiving unit 20 arranged for receiving the subscriber data, upon registration of a subscriber with said network. The S-CSCF server also includes a transmitting unit 22 arranged for transmitting information representative of the subscriber data to a P-CSCF server 2 (see FIG. 6) and/or to an HSS 6 (see FIG. 7). The transmitting unit 22 is also arranged for transmitting the S-CSCF group address to the P-CSCF server 2 and/or to the HSS 6. The information representative of the subscriber data transmitted by the S-CSCF server 4 to the P-CSCF server 2 and/or to the HSS 6 can include the actual subscriber data. The information representative of the subscriber data transmitted by the S-CSCF server 4 to the P-CSCF 2 and/or to the HSS 6 can also include a storage address (such as a (secure) File Transfer Protocol (FTP) address or (secure) Hypertext Transfer Protocol (HTTP) address) where the actual subscriber data is stored and can be retrieved from by the P-CSCF server and/or by the HSS.

The P-CSCF server 2 includes a memory 24, and/or has a memory 24' associated therewith, for storing the information representative of the subscriber data. The P-CSCF server also includes a receiving unit 26 arranged for receiving a multimedia service request, being a session initiation message, e.g. from a UE associated with the subscriber, for initiating a communication session or a non-session related multimedia service transaction, said multimedia service request optionally including a S-CSCF group address. The receiving unit 26 is also arranged for receiving the information representative of the subscriber data from the S-CSCF server 4.

The P-CSCF server 2 includes a selection unit 28 arranged for selecting a S-CSCF server on the basis of the S-CSCF group address. The P-CSCF server 2 includes an inclusion unit 30 arranged for including information representative of the subscriber data in the multimedia service request. The P-CSCF server 2 includes a transmitting unit 32 arranged for transmitting said multimedia service request to the selected S-CSCF server 4.

The HSS 6 includes a memory 40, and/or has a memory 40' associated therewith, for storing the information representative of the subscriber data. The HSS 6 also includes a receiving unit 42 arranged for receiving the information representative of the subscriber data and/or the S-CSCF group address from the S-CSCF server 4. The HSS also includes a transmitting unit 44.

The I-CSCF server 14 includes a receiving unit 50 arranged for receiving a multimedia service request being a session initiation message, such as a terminating session initiation message destined for a subscriber or an originating session initiation message from a SIP-AS acting on behalf of a subscriber. The I-CSCF server also includes an interrogating unit 52 arranged for interrogating the HSS 6 for obtaining the S-CSCF group address stored in the memory 40 or 40'. The interrogating unit 52 is also arranged for obtaining the information representative of the subscriber data.

The I-CSCF server 14 includes a selection unit 54 arranged for selecting a S-CSCF server on the basis of the S-CSCF group address. The I-CSCF server includes an inclusion unit 56 arranged for including the obtained information representative of the subscriber data in the session initiation message. The I-CSCF server 14 includes a transmitting unit 58 arranged for transmitting said session initiation message to the selected S-CSCF server.

In an example, the selection unit 28 or 54 is arranged for selecting the S-CSCF server on the basis of at least one of
 an internal table of S-CSCF servers associated with the S-CSCF group address,
 DNS based name resolving of the S-CSCF group address, the operational condition, including load status, of the S-CSCF servers included in the group of S-CSCF servers.

In the event that the information representative of the subscriber data obtained by the interrogating unit 52 includes a time-stamp indicating when the information representative of the subscriber data was last updated, the S-CSCF server 4 includes a determination unit 60 arranged for determining, upon receiving the multimedia service request, whether it has cached subscriber data associated with the subscriber. If the S-CSCF server does not have the subscriber data cached, it retrieves the subscriber data from the storage address. If the S-CSCF server has the subscriber data cached, the determination unit 60 compares a time-stamp of the cached subscriber data with the time-stamp received in the information representative of the subscriber data. If the time-stamp received in the information representative of the subscriber data is later than the time-stamp of the cached subscriber data, the S-CSCF retrieves the subscriber data from the storage address.

It will be appreciated that the receiving units 20,26,42,50, transmitting units 22,32,44,58, selection units 28,54, inclusion units 30,56, and determination unit 60 can be embodied as dedicated electronic circuits, possibly including software code portions. The receiving units 20,26,42,50, transmitting units 22,32,44,58, selection units 28,54, inclusion units 30,56, and determination unit 60 can also be embodied as software code portions executed on, and e.g. stored in a memory of, a programmable apparatus such as a computer In the foregoing specification, the invention has been described with reference to specific examples of embodiments of the invention. It will, however, be evident that various modifications and changes may be made therein without departing from the broader spirit and scope of the invention as set forth in the appended claims.

An IMS network architecture is proposed that applies distributed S-CSCF server allocation. A subscriber is not assigned statically to a S-CSCF server. Instead, a S-CSCF server is selected per SIP session. Subscription data and registration data that is needed for the SIP session handling by the selected S-CSCF server is provided by the P-CSCF server to the S-CSCF server during originating session establishment or by the HSS during terminating establishment. For originating session establishment that runs via an I-CSCF server, the HSS will provide the required subscription data and registration data.

The invention may lead to improved load sharing based on the actual traffic generated by end-terminals, increased robustness of the IMS network and increased resilience against temporary S-CSCF server outage or IP signaling connection outage. In addition, the invention may lead to more evenly spread IP signaling (SIP signaling) in the network; the selection of a S-CSCF server for a particular SIP session may be based on, among others, IP connection to the S-CSCF servers in the group of S-CSCF servers, in order to spread the load over specific IP signaling connections.

The invention may be considered as an architectural principle for IMS network evolution, considering, among others, the need for further improving the robustness of the IMS network The invention proposes a method that allows for ad-hoc selection of a registrar and service node in an IMS-based IP network, such as a Voice-over-IP (VOIP) network. Subscribers may be served by any available registrar, as opposed to being statically allocated to a designated registrar. Subscriber registration (including re-registration and de-registration) as well as traffic (communication session) handling may be spread over available registrars, allowing for more controlled node usage and more controlled link usage. Temporary node outage (planned/unplanned) will automatically result in selection of another available registrar.

This method increases robustness of the IMS network; when one registrar is temporarily inoperative, communication sessions may still be established.

The proposed method can be expanded such that the HSS can control the number of contacts that are registered for a subscriber.

For instance, Registrations and de-registrations for a particular contact go via the HSS. The HSS is hence informed about the registration or deregistration of a (additional) contact. Hence, HSS can allow or disallow the registration of an additional contact, when the allowed maximum has been reached. Disallowing registration of an additional contact is done by the HSS by sending an error response to the I-CSCF server, when the I-CSCF server contacts the HSS during the registration process.

It is possible to control the maximum number of allowed simultaneous sessions. The IMS subscriber will be registered at a P-CSCF server. The subscriber data contains a parameter indicating the maximum allowed number of simultaneous sessions. The P-CSCF server can hence ensure that the maximum is not exceeded.

It is appreciated that different contacts of the subscriber may be registered through different P-CSCF servers. The control of (the maximum number of) simultaneous SIP sessions for a subscriber applies per P-CSCF server.

SIP sessions, such as voice calls or video calls, will typically be under control of an application server (AS), such as a Multimedia telephony server. The subscriber is, at any moment, assigned to at most one Multimedia telephony server. The Multimedia telephony server may therefore control the maximum allowed simultaneous multimedia sessions. This includes both originating sessions from any registered contact address, and terminating sessions.

Combined with the aforementioned method of the HSS to control the number of registered contact addresses, there should be sufficient capability to control the maximum allowed simultaneous multimedia sessions.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method for enabling server allocation in an Internet Protocol Multimedia Subsystem (IMS) based Multimedia over Internet Protocol (IP) network, the method comprising:
receiving registration data, by a Serving Call Session Control Function (S-CSCF) server of the network, upon registration of a subscriber in said network;
receiving subscription data, by the S-CSCF server, upon registration of said subscriber in said network, the registration data and the subscription data together forming subscriber data;

transmitting, by the S-CSCF server, information representative of the subscriber data needed in the S-CSCF server for originating session establishment from the subscriber, to a Proxy Call Session Control Function (P-CSCF) server for storing the information representative of the subscriber data in a memory by the P-CSCF server;

transmitting to a Home Subscriber Server (HSS), by the S-CSCF server, information representative of the subscriber data needed in the S-CSCF server for originating or terminating session establishment with the subscriber, for storing the information representative of the subscriber data in a memory by the HSS;

transmitting an S-CSCF group address, by the S-CSCF server, to the P-CSCF server and to the HSS, respectively, said S-CSCF group address being representative of a group of S-CSCF servers, the S-CSCF server being included in said group of S-CSCF servers.

2. The method of claim 1, further comprising:

receiving, by the P-CSCF server, a multimedia service request, being a session initiation message for initiating a communication session or a non-session related multimedia service transaction;

selecting, by the P-CSCF server, a S-CSCF server on the basis of the S-CSCF group address, and including, by the P-CSCF server, information representative of the subscriber data in the multimedia service request, and transmitting said multimedia service request, including the information representative of the subscriber data, to the selected S-CSCF server.

3. The method of claim 1, including the following steps:

receiving, by an Interrogating Call Session Control Function (I-CSCF) server, a multimedia service request being a session initiation message destined for the subscriber;

interrogating the Home Subscriber Server (HSS) associated with the subscriber, by the I-CSCF server, for obtaining the Serving Call Session Control Function (S-CSCF) group address and for obtaining information representative of the subscriber data;

selecting, by the I-CSCF server, a S-CSCF server on the basis of the S-CSCF group address; and including, by the I-CSCF server, information representative of the subscriber data in the session initiation message and transmitting said session initiation message, including the information representative of the subscriber data, to the selected S-CSCF server.

4. The method of claim 1, further comprising:

receiving, by an Interrogating Call Session Control Function (I-CSCF) server, a multimedia service request, being a session initiation message for originating a communication session on behalf of the subscriber or a non-session related multimedia service transaction;

interrogating the Home Subscriber Server (HSS) associated with the subscriber, by the I-CSCF server, for obtaining the Serving Call Session Control Function (S-CSCF) group address and information representative of the subscriber data;

selecting, by the I-CSCF server, a S-CSCF server on the basis of the S-CSCF group address;

including, by the I-CSCF server, information representative of the subscriber data in the multimedia service request; and transmitting said multimedia service request, including the information representative of the subscriber data, to the selected S-CSCF server.

5. The method of claim 2, wherein the Proxy Call Session Control Function (P-CSCF) server selects the Serving Call Session Control Function (S-CSCF) server on the basis of one or more of:

an internal table of S-CSCF servers associated with the S-CSCF group address;

DNS-based name resolving of the S-CSCF group address; and the operational condition, including load status, of the S-CSCF servers included in the group of S-CSCF servers.

6. The method of claim 1, wherein the Serving Call Session Control Function (S-CSCF) server refrains from persistently storing, for the duration of the registration period, information representative of the subscriber data.

7. The method of claim 1, wherein the information representative of the subscriber data includes a storage address where the subscriber data can be obtained.

8. The method of claim 7, wherein the information representative of the subscriber data includes a time stamp indicating when the subscriber data was last updated.

9. The method of claim 8, wherein the Serving Call Session Control Function (S-CSCF) server determines, upon receiving the multimedia service request, whether it has cached subscriber data associated with the subscriber, and:

in response to determining that the S-CSCF server does not have the subscriber data cached, retrieving the subscriber data from the storage address; or in response to determining that the S-CSCF server has the subscriber data cached, comparing a time stamp of the cached subscriber data with the time-stamp received in the information representative of the subscriber data and, if the time-stamp received in the information representative of the subscriber data is different from the time stamp of the cached subscriber data, retrieving the subscriber data from the storage address.

10. A network node for use in an Internet Protocol Multimedia Subsystem (IMS) based Multimedia over Internet Protocol (IP) network, the network node comprising:

a receiving unit arranged for receiving registration data of said subscriber and receiving subscription data of said subscriber, upon registration of said subscriber with said network, the registration data and the subscription data together forming subscriber data;

a transmitting unit arranged for transmitting, to a Proxy Call Session Control Function (P-CSCF), a node group address and information representative of the subscriber data needed in a S-CSCF server for originating session establishment from the subscriber and arranged for transmitting a node group address and information representative of the subscriber data needed in the S-CSCF server for originating or terminating session establishment with the subscriber, to a Home Subscriber Server (HSS), for storing the information representative of the subscriber data in a memory by the P-CSCF server and by the HSS, respectively, said node group address being representative of a group of network nodes that includes the network node.

11. The network node of claim 10, wherein the information representative of the subscriber data includes a storage address where the subscriber data can be obtained, and a time stamp indicating when the subscriber data was last updated.

12. The network node of claim 11, further comprising a determination unit arranged for determining, upon receiving a multimedia service request, whether it has cached subscriber data associated with the subscriber, and in response to determining that the network node does not have the subscriber data cached, retrieving the subscriber data from the storage address, and, in response to determining that the network node has the subscriber data cached, comparing a time stamp of the cached subscriber data with the time-stamp received in the information representative of the subscriber data and, if the time-stamp received in the information representative of the subscriber data is different from the time stamp of the cached subscriber data, retrieving the subscriber data from the storage address.

13. A network node for use in an Internet Protocol Multimedia Subsystem (IMS) based Multimedia over Internet Protocol (IP) network, the network node comprising:

a receiving unit arranged for receiving a multimedia service request sent by a user equipment (UE), the multimedia service request being a session initiation message for initiating a communication session or a non-session related multimedia service transaction, said multimedia service request including a Serving Call Session Control Function (S-CSCF) group address;

a selection unit arranged for selecting a S-CSCF server on the basis of the S-CSCF group address;

an inclusion unit arranged for including, in the multimedia service request, information representative of subscriber data; and a transmitting unit arranged for transmitting said multimedia service request, including the information representative of subscriber data, to the selected S-CSCF.

14. The network node of claim 13, wherein the selection unit is arranged for selecting the Serving Call Session Control Function (S-CSCF) server on the basis of at least one of:

an internal table of S-CSCF servers associated with the S-CSCF group address,

DNS based name resolving of the S-CSCF group address, and the operational condition, including load status, of the S-CSCF servers included in a group of S-CSCF servers associated with the S-CSCF group address.

15. The network node of claim 13, wherein the information representative of the subscriber data includes a storage address where the subscriber data can be obtained, and a time stamp indicating when the subscriber data was last updated.

16. The network node of claim 15, further comprising a determination unit arranged for determining, upon receiving the multimedia service request, whether it has cached subscriber data associated with the subscriber, and in response to determining that the network node does not have the subscriber data cached, retrieving the subscriber data from the storage address, and, in response to determining that the network node has the subscriber data cached, comparing a time stamp of the cached subscriber data with the time-stamp received in the information representative of the subscriber data and, if the time-stamp received in the information representative of the subscriber data is different from the time stamp of the cached subscriber data, retrieving the subscriber data from the storage address.

17. A network node for use in an Internet Protocol Multimedia Subsystem (IMS) based Multimedia over Internet Protocol (IP) network, the network node comprising:

a receiving unit arranged for receiving a multimedia service request being a session initiation message;

an interrogating unit arranged for interrogating a Home Subscriber Server (HSS) for obtaining a Serving Call Session Control Function (S-CSCF) group address, and for obtaining information representative of subscriber data of the subscriber;

a selection unit arranged for selecting a S-CSCF on the basis of the S-CSCF group address;

an inclusion unit arranged for including the obtained information representative of the subscriber data in the session initiation message; and a transmitting unit arranged for transmitting said session initiation message, including the information representative of the subscriber data, to the selected S-CSCF server.

18. The network node of claim 17, wherein the selection unit is arranged for selecting the Serving Call Session Control Function (S-CSCF) server on the basis of at least one of:

an internal table of S-CSCF servers associated with the S-CSCF group address,

DNS based name resolving of the S-CSCF group address, and the operational condition, including load status, of the S-CSCF servers included in a group of S-CSCF servers corresponding to the S-CSCF group address.

19. The network node of claim 17, wherein the information representative of the subscriber data includes a storage address where the subscriber data can be obtained, and a time stamp indicating when the subscriber data was last updated.

20. The network node of claim 19, further comprising a determination unit arranged for determining, upon receiving the multimedia service request, whether it has cached subscriber data associated with the subscriber, and in response to determining that the network node does not have the subscriber data cached, retrieving the subscriber data from the storage address, and, in response to determining that the network node has the subscriber data cached, comparing a time stamp of the cached subscriber data with the time-stamp received in the information representative of the subscriber data and, if the time-stamp received in the information representative of the subscriber data is different from the time stamp of the cached subscriber data, retrieving the subscriber data from the storage address.

* * * * *